United States Patent [19]

Fey et al.

[11] Patent Number: 4,554,331
[45] Date of Patent: Nov. 19, 1985

[54] LIQUID COPOLYMERIC ORGANOSILOXANES

[75] Inventors: Kenneth C. Fey, Midland; Harold V. Lefler, III, Sanford, both of Mich.

[73] Assignee: Dow Corning Corporation, Midland, Mich.

[21] Appl. No.: 627,124

[22] Filed: Jul. 2, 1984

[51] Int. Cl.$^4$ ............................................. C08F 283/00
[52] U.S. Cl. ..................................... 525/478; 525/477; 525/474; 528/26; 528/31; 528/33; 528/34
[58] Field of Search ...................... 525/478, 477, 474; 528/33, 34, 26, 31

[56] References Cited

U.S. PATENT DOCUMENTS

| | | | |
|---|---|---|---|
| 4,255,316 | 3/1981 | Blizzard | 525/477 |
| 4,257,932 | 3/1981 | Beers | 525/477 |
| 4,310,678 | 1/1982 | Blizzard et al. | 556/451 |

Primary Examiner—Melvyn I. Marquis
Attorney, Agent, or Firm—Andrew H. Ward

[57] ABSTRACT

Improved reactive liquid silicone resins are disclosed. The resins are the product of certain reactive liquid resins and a compound selected from acyloxysilanes, alkoxysilanes, and oximosilanes. When incorporated in a curable silicone composition, such as an elastomeric coating, the improved resins of this invention confer improved working time to the curable composition, and enhance the adhesion of the curable composition to a substrate.

11 Claims, No Drawings

LIQUID COPOLYMERIC ORGANOSILOXANES

BACKGROUND OF THE INVENTION

The present invention relates to improved liquid copolymeric reactive organosiloxane resins.

Useful liquid copolymeric organosiloxane resins are disclosed in U.S. Pat. No. 4,310,678, issued Jan. 12, 1982 to Blizzard et al. and assigned to the assignee of the present invention. The resins of Blizzard et al. comprise the reaction product of a particular resin and an organohydrogensiloxane. The resins of Blizzard et al. are useful as reactive components in curable silicone compositions such as coatings and elastomers.

Unfortunately, the resins of Blizzard et al. are sometimes excessively reactive with the other components of a curable silicone composition, which can lead to inconveniently short working times for the curable composition. This problem is especially acute when the curable compositions are catalyzed by tin compounds. Additionally, coating compositions containing the resins of Blizzard often have less than ideal adhesion to the substrates to which they have been applied.

The present invention deals with an improvement on the resins of Blizzard. Surprisingly, when the resins of Blizzard are reacted with a compound selected from acyloxysilanes, alkoxysilanes, oximosilanes, and acyl halides, improvements in adhesion and/or working time are found in curable compositions incorporating these resins.

SUMMARY OF THE INVENTION

It is an object of the present invention to provide an improved reactive silicone resin. It is a further object to provide novel silicone resins that confer increased working time to curable silicone compositions in which they are incorporated. It is yet a further object to provide reactive silicone resins that confer improved adhesion to curable silicone coatings into which they are incorporated.

These objects are attained by the improved resins of the present invention, which resins are the product obtained by reacting:
(A) certain liquid copolymer silicone resins; with
(B) a compound selected from acyloxysilanes, alkoxysilanes, oximosilanes, and acyl halides.

DETAILED DESCRIPTION OF THE INVENTION

The present invention relates to a composition comprising the product obtained by reacting:
(A) the reaction product of
  (i) an organosilicon resin consisting essentially of $R_3SiO_{\frac{1}{2}}$ units and $SiO_{4/2}$ units, wherein R represents a monovalent hydrocarbon radical, and the ratio of $R_3SiO_{\frac{1}{2}}$ units to $SiO_{4/2}$ units is from 0.6/1 to 0.9/1 and (ii) a polyorganohydrogensiloxane; with
(B) a compound selected from the group consisting of acyloxysilanes, alkoxysilanes, oximosilanes, and acyl halides.

Component (A) of the composition of the present invention is the reaction product of: (i) and organosilicon resin consisting essentially of $R_3SiO_{\frac{1}{2}}$ units and $SiO_{4/2}$ units, wherein R is a monovalent hydrocarbon radical and the ratio of $R_3SiO_{\frac{1}{2}}$ units to $SiO_{4/2}$ unit is from 0.6/1 to 0.9/1; and (ii) a polyorganohydrogensiloxane.

Component (A) of the curable composition of the present invention is disclosed in U.S. Pat. No. 4,310,678, issued Jan. 12, 1982 to Blizzard and Swihart and assigned to the assignee of the present invention. The specification of U.S. Pat. No. 4,310,678 is hereby incorporated into the present specification by reference to describe component (A) of the present invention and to teach methods of synthesizing said component (A).

Briefly stated, component (A) can be synthesized by reacting together:
(i) an organsilicon resin consisting essentially of $R_3SiO_{\frac{1}{2}}$ units and $SiO_{4/2}$ units in the ratio stated above; and
(ii) a polyorganohydrogensiloxane.

R in reactant (i) represents a monovalent hydrocarbon radical, that is, a monovalent radical composed of hydrogen atoms and carbon atoms. R can thus be an alkyl radical, such as methyl, ethyl, butyl, propyl and the like; an alkenyl or cycloalkenyl radical, such as vinyl, allyl, cyclopentenyl and the like; an aryl radical, such as phenyl, tolyl, xylyl and the like; an arylalkyl radical, such as beta-phenylethyl, beta-phenylpropyl and the like; or a cycloaliphatic radical, such as cyclohexyl, cyclopentyl, cycloheptyl and the like. Preferably R is a lower alkyl radical, such as methyl, ethyl, or propyl. Most preferably, R is a methyl radical. Minor amounts of vinyl radicals as R radicals are beneficial to enhance reactivity in some cases. Reactant (i) contains from 0.1% to 5% by weight, based on the toal weight of reactant (i), of hydroxyl radicals bonded to silicon atoms. Minor proportions of alkoxy radicals are often unintentionally present in organosilicon resins. The presence of minor amounts of alkoxy radicals in reactant (i) is not thought to have any effect on the ultimate curable silicone compositions.

Preferably, reactant (i) is comprised of 1 to 5 percent by weight of silicon-bonded hydroxyl radicals, based on the total weight of reactant (i).

For the purpose of making Component (A), reactant (i) is furnished dispersed in an organic solvent. The particular identity of the organic solvent is not critical, although it is advantageous to select an organic solvent which forms an azeotrope with water. Such organic solvents are well known for this purpose, and include, for example, benzene, toluene, xylene, and trichlorethane.

Organosilicon resins as described above for reactant (i), and their synthesis, are described in U.S. Pat. No. 2,676,182, issued April 20, 1954, which patent is incorporated herein by reference to teach a method of synthesis for reactant (i).

To summarize a preferred method of synthesis of reactant (i), the following steps are performed:
1. An aqueous solution of sodium silicate is acidified to a pH value of less than about 5;
2. The resulting mixture is treated with a source of $R_3SiO_{\frac{1}{2}}$ units;
3. The mixture from step 2 is heated, then cooled;
4. The product of step 3 is fractionally extracted with an appropriate, water-immiscible organic solvent. An organosilicon resin suitable for use as reactant (i) is isolated in the organic solvent fraction.

Sources of $R_3SiO_{\frac{1}{2}}$ units include compounds having the general formula $R_3SiX$, wherein X is a hydrolyzable radical, such as a halogen radical, or alkoxy radical; a disiloxane of the general formula $(R_3Si)_2O$; or other sources of $R_3SiO_{\frac{1}{2}}$ units known to those skilled in the art.

Preferably, the extraction in step 4 above is carried out in such a manner that from 0.0018 to 0.018 equivalents of acid per gram of reactant (i) remain in the solvent/reactant (i) fraction.

Reactant (ii) of component (A) of the composition of the present invention is a polyorganohydrogensiloxane, as described in U.S. Pat. No. 4,322,518 issued Mar. 30, 1982. By polyorganohydrogensiloxane it is meant herein a liquid polyorganosiloxane containing an average of at least one silicon-bonded H radical per molecule.

Reactant (ii) can have a linear, cyclic, or branched polymeric structure, or appropriate combinations of these structures, provided that said reactant (ii) is a liquid. Radicals of reactant (ii) that are not silicon-bonded hydrogen radicals are selected from monovalent hydrocarbon radicals as hereinabove described. A linear polyorganohydrogensiloxane consisting primarily of $(CH_3)(H)SiO$ units, and having a degree of polymerization of from 25 to 75 repeat units is a preferred reactant (ii).

Polyorganohydrogensiloxanes suitable for use as reactant (ii) are well known; many are available commercially. Said polyorganohydrogensiloxanes need not be further detailed herein.

Preferably, reactant (i) and reactant (ii) can be reacted together to form component (A) in the following manner:

Reactant (i), dispersed in organic solvent, is first thoroughly mixed with reactant (ii). The resultant mixture is heated to volatilize and remove the organic solvent from the mixture. Said heating is preferably done in two stages. In a first stage, heating and removal of some of the organic solvent is accomplished at ambient pressure. In a second stage heating and solvent removal are continued at reduced pressure. The second stage is preferably continued until the organic solvent has been substantially removed.

By substantially removed it is meant herein that the concentration of organic solvent is less than 1% by weight, based on the total weight of the mixture.

Alternatively, some or all of the organic solvent can be retained along with the reaction product of (i) and (ii). It has been found that the adhesion of a final cured composition to, e.g., underlying polyurethane foam is enhanced if from 1 to 15 percent by weight, of solvent, based on the total weight of the reaction product is retained with the reaction product.

If reactant (i), as furnished, does not contain from 0.0018 to 0.018 equivalents of acid per gram, it is necessary to add the required amount to provide 0.0018 equivalents per gram, of a strong acid, such as HCl, to the reaction mixture.

The relative amounts of reactant (i) and reactant (ii) that are used are not overly critical. Generally, from 10 to 90 parts by weight of reactant (i) are reacted with 90 to 10 parts by weight of reactant (ii). More preferably, roughly equal parts by weight of reactants (i) and (ii) are used, such as 40 to 60 parts by weight of reactant (i) and 60 to 40 parts by weight of reactant (ii), all of the above parts based on 100 total parts by weight of component (A).

Component (B) of the composition of the present invention is selected from the group consisting of acyloxysilanes, alkoxysilane, oximosilanes, and acyl halides.

Acyloxysilanes have the general formula $R''_nSiX_{4-n}$, wherein $R''$ is a monovalent hydrocarbon radical as described above and X is an acyloxy radical, such as acetoxy, propionoxy, benzyloxy, cyclohexyloxy, acrylyloxy, methacrylyloxy, napthoyloxy, trifouoroacetoxy, chlorobenzyloxy and the like. The value of n in the formula for the acyloxysilane is 1, 2, or 3.

Examples of acyloxysilanes include

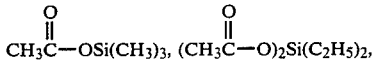

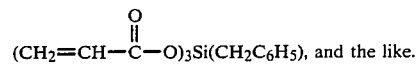

and the like.

Alkoxysilanes are described by the general formula $R''_pSi(OR'')_{4-p}$, wherein p has a value of 1, 2, or 3, and each $R''$ is selected from the group consisting of monovalent hydrocarbon radicals free of aliphatic unsaturation.

Thus, for example, $R''$ can be an alkyl radical, such as methyl, ethyl, propyl, butyl, and the like.

Examples of specific alkoxysilanes include $CH_3Si(OCH_3)_3$, $C_2H_5Si(OC_3H_7)_3$, and

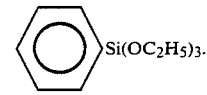

Other possible structures will be apparent from consideration of the above general formula.

Oximosilanes have the general formula $Q_{4-n}Si(ON=CR_2''')_m$ wherein each $R'''$ is selected from hydrogen atoms and alkyl radicals having from 1 to 5 carbon atoms, Q is a monovalent hydrocarbon radical as described hereinabove, and m has a value of 1, 2, or 3.

Examples of suitable oximosilanes include $CH_3Si(ON=C(CH_3)_2)_3$, $CH_3Si(ON=C(C_2H_5)_2)_3$, $CH_3Si(ON=C(CH_3)C_2H_5)_3$, $Si(ON=C(CH_3)C_2H_5)_4$, and the like.

Acyl halides are organic reagents having the general formula $R''''X'''$, wherein $R''''$ is an acyl radical, and $X'''$ is selected from F, Cl, Br, and I atoms.

Acyl radicals are monovalent hydrocarbon radicals or substituted monovalent hydrocarbon radicals linked to a carbonyl group. Examples of acyl radicals include

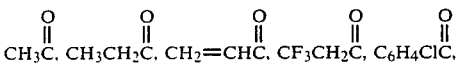

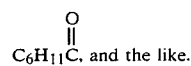

and the like.

Examples of suitable acyl halides are

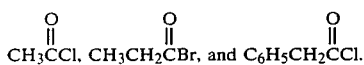

Other suitable acyl halides will be familiar to those of skill in the art.

Acyloxysilanes, alkoxysilanes, oximosilanes, and acyl halides as described herein are well known and widely available from commercial sources. Their laboratory preparation is also well known and need not be detailed here.

Mixtures of acyloxysilanes, alkoxysilanes, oximosilanes, or acyl halides can be reacted with component (A) provided the components (B) selected are not reactive with one another.

The composition of the present invention is produced by contacting reactant (A) as above described with reactant (B) as above described.

The reaction producing the compositions of the present invention is energetically favored. Thus, in most cases it is sufficient that the two reactants came into contact with one another for a sufficient length of time to react. In a few cases, external heating may be required to promote full reaction.

The reaction results in the byproduction of volatile compounds, e.g. alcohols, acids, and ketoximes. While it is sometimes not necessary to remove said volatile compounds, in most cases it will be desired to remove these byproducts by, for example, fractional distillation.

To exemplify different methods of performing the reaction of (A) and (B) to produce the composition of the present invention, the following reaction procedures are here included.

In a first method, reactants (A) and (B) are mixed together in a vessel equipped with a mechanical stirrer. Reactants (A) and (B) react to form a composition of the present invention.

In a second method, reactants (A) and (B) are mixed together in a vessel and external heating is applied such that the temperature of the reaction mixture is elevated 5° C. to 100° C. over ambient temperature. Said applied heating is maintained for from 5 minutes to 5 hours.

In a third method, the procedure of the second method is followed until reaction is complete, at which time the reaction mixture is subjected to fractional distillation to remove the byproducts.

Each of the above three methods can be performed in a batch process as described above, or in a continuous process with appropriate feed pumps, piping, heating means, reboilers and such. The design of such processes, and others, is well within the ordinary skill of a chemical engineer.

From 1 to 50 parts by weight of component (B) are reacted with each 100 parts by weight of component (A). More preferably, from 20 to 40 parts by weight of component (B) are reacted with 100 parts of component (A). Most preferably, from 40 to 30 parts by weight of component (B) are reacted with each 100 parts by weight of component (A).

The compositions of the present invention are useful as reactive additives to curable silicones.

By way of example, the compositions of the present invention can be incorporated into coatings, such as coatings for wood, paper, stone, or plastics; or the compositions of the present invention can be incorporated into compositions curable to elastomers.

The compositions of the present invention are especially useful in the curable compositions disclosed and claimed in copending U.S. Ser. No. 627,136, filed of even date herewith and assigned to the assignee of the present invention. The specification of said U.S. Ser No. 627,136 is hereby incorporated herein to further teach how to use the compositions of the present invention.

The following Examples are presented to further teach how to make and use the compositions of the present invention. Parts and percentages herein are by weight unless otherwise specified. The term Me is used in the Examples to represent the methyl redical.

The following test procedures were used to evaluate cured compositions in which compositions of the present invention were incorporated.

TENSILE STRENGTH AND ELONGATION

Tensile strength and elongation values reported herein were measured by the general procedure set forth in American Society for Testing and Materials, (ASTM), Standard D412.

DUROMETER, SHORE A

Durometer, a measure of the indentation hardness of a material, was measured by the general procedure of ASTM Standard D2240.

EXAMPLE 1

Synthesis of Component (A)

A mixture was charged to a vessel provided with a stirrer. The mixture consisted of:
(i) 41.2 parts of an organosilicon resin composed of $Me_3SiO_{\frac{1}{2}}$ units and $SiO_{4/2}$ units in the ratio of 0.6 $Me_3SiO_{\frac{1}{2}}$ units to 1 $SiO_{4/2}$ unit;
(ii) 41.2 parts of a polymer having the average formula $Me_3SiO(MeHSiO)_{35}SiMe_3$; and 17.6 parts of xylene.

This mixture, with continuous stirring, was heated to a temperature of 150° C. The pressure in the vessel was gradually reduced to a value between 40 mm and 50 mm Hg. Heating under reduced pressure was continued for approximately 2 hours. During this time, volatilized xylene was removed and condensed in a reservoir separate from the vessel containing the mixture. After 2 hours, the reaction product was recovered. It was a substantially solvent free liquid organosilicon resin as described hereinabove as Component (A) of the compositions of the present invention.

Reaction of Components (A) and (B)

Eighty parts of the component (A) described above, and 10 parts of a mixture of approximately equal quantities of methyltriacetoxysilane and ethyltriacetoxysilane were mixed together in a reaction vessel equipped with a mechanical stirrer and vacuum distillation apparatus.

The above mixture was heated to a temperature of 80° C. for approximately one hour. At the end of one hour, the pressure was reduced and volatile material was fractionally distilled. The resulting product was a yellow fluid.

EXAMPLE 2

Sixteen grams of component (A), synthesized above in Example 1, was added to 6.0 g of oximosilane consisting of 13% $Si(ON=C(CH_3)C_2H_5)_4$; 56% $Si(OC_2H_5)(ON=C(CH_3)C_2H_5)_3$; 23% $Si(OC_2H_5)_2(ON=C(CH_3)C_2H_5)_2$; 3% $Si(OC_2H_5)_3(ON=C(CH_3)C_2H_5)$ and 5% impurities, in a glass bottle which had been rinsed with a mild acidic solution. After 24 hours a clear fluid was observed in the bottle.

26.7 parts of the clear fluid; 58.5 parts of an hydroxyl endblocked polydimethylsiloxanes; and 14.8 parts of titania, were mixed together and coated upon polyurethane foam.

The resulting coating showed maximum adhesion to polyurethane foam. Maximum adhesion is evidenced by cohesive failure, i.e. the strength of the adhesive bond is greater than the internal strength of the coating.

The cured coating, cured and tested per se, had a Shore A durometer of 40, tensile strength of 245 psi, and an elongation of 150%.

That which is claimed is:

1. A composition comprising the product obtained by reacting:
   (A) 100 parts by weight of the reaction product of
     (i) an organosilicon resin consisting essentially of $R_3SiO_{\frac{1}{2}}$ units and $SiO_{4/2}$ units, wherein R represents a monovalent hydrocarbon radical, and the ratio of $R_3SiO_{\frac{1}{2}}$ units to $SiO_{4/2}$ units is from 0.6/1 to 0.9/1 and
     (ii) a polyorganohydrogensiloxane; with
   (B) 1 to 50 parts by weight of a compound selected from the group consisting of acyloxysilanes, alkoxysilanes, oximosilanes, and acyl halides, said reacting being done at a temperature and for a period of time sufficient to by-produce a volatile compound selected from the group consisting of alcohols, acids and ketoximes.

2. A composition as claimed in claim 1 wherein component (B) is an acyloxysilane.

3. A composition as claimed in claim 2 wherein the acyloxysilane is methyltriacetoxysilane.

4. A composition as claimed in claim 2 wherein the acyloxysilane is ethyltriacetoxysilane.

5. A composition as claimed in claim 2 wherein the acyloxysilane is a mixture of methyltriacetoxysilane and ethyltriacetoxysilane.

6. A composition as claimed in claim 5 wherein the methyltriacetoxysilane and ethyltriacetoxysilane are present in approximately equal quantities by weight.

7. A composition as claimed in claim 1 wherein component (B) is an alkoxysilane.

8. A composition as claimed in claim 7 wherein the alkoxysilane is methyltrimethoxysilane.

9. A composition as claimed in claim 1 wherein component (B) is an oximosilane.

10. A composition as claimed in claim 9 wherein the oximosilane is $CH_3Si(O=NC(CH_3)C_2H_5)_3$.

11. A composition as claimed in claim 9 wherein the oximosilane is $Si(O=NC(CH_3)C_2H_5)_4$.

* * * * *